Figure 1:
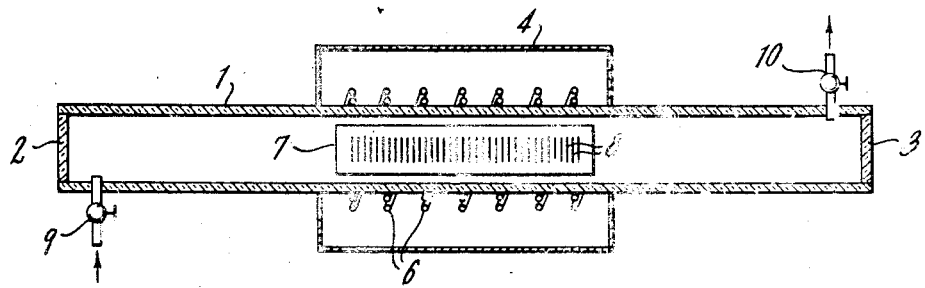

Nov. 8, 1949     T. R. PALUMBO     2,487,581

ELECTRICAL RESISTOR AND METHOD OF MAKING SAME

Filed March 31, 1948

INVENTOR.
THEODORE R. PALUMBO
BY
ATTORNEY

UNITED STATES PATENT OFFICE 2,487,581

ELECTRICAL RESISTOR AND METHOD OF MAKING SAME

Theodore R. Palumbo, Keyport, N. J.

Application March 31, 1948, Serial No. 18,237

11 Claims. (Cl. 201—75)

The present invention relates to electric resistances or heating elements. More particularly, the invention relates to an improved electric resistance consisting of a porous refractory body, impregnated with a pure hard oxidation-resisting type of carbon in a stable heat-resistant form.

The refractory bodies of this invention may in a loose sense be described as "carburized," but in ordinary meaning a carburized body is one which has merely a surface impregnation of carbon, and where the word is used in the present application it is to be understood as being considerably more than this, since the refractory bodies of the invention are impregnated throughout all cross sectional planes with a pure hard carbon obtained by the decomposition of a hydrocarbon gas or mixture at a relatively high temperature. It is well known to deposit a coating of carbon on ceramic bodies or metals by the heating of the bodies to a temperature of about 800° to 900° C. and subjecting them to a stream of hydrocarbon gas or gas mixture so that the gas in contacting the heated bodies is cracked or decomposed and the carbon from the gas is deposited only on the surface of the bodies as an adherent film or surface coating. The density of such films or coatings is dependent primarily upon the duration of the treatment, the concentration of the gas, and the temperature to which the body is heated. In such procedure, great care is necessary to secure uniformity of coating as well as to avoid soot or soft carbon deposit on the surface.

It is a particular object of the present invention to produce an electric resistance comprising a ceramic or refractory body which is permeated throughout with a pure hard stable carbon practically uniformly distributed throughout.

It is a further object to provide a novel and improved electric resistance and a method of making the same.

Briefly described, the improved electric resistance of this invention comprises a porous refractory material into which a pure hard carbon has been introduced by a cracking process. The carbon is of the pure hard oxidation-resistant type and is practically uniformly distributed throughout the porous body and particularly in the crystal boundaries and probably within the basic units themselves as carbide. The density of the carbon impregnation and hence the electric resistance of the impregnated refractory material normally depends upon the cracking temperature, the temperature distribution through the refractory body or material, the time of the exposure in the cracking zone and the hydrocarbon content of the carburizing agent used. By adjustment of one or more of these factors, the electrical resistance of the body can be controlled within relatively close tolerances of predetermined values of resistance.

A cracking process can produce either hard or soft carbon depending upon the temperature employed. The soft carbon can generally be associated with the soot type of carbon and is a more active form of carbon, possessing relatively little resistance to oxidation at 300° C. in the air. A hard type of carbon is generally the result of cracking a hydrocarbon gas or vapor at a temperature about or above 800° C. It is comparatively inert and quite resistant to oxidation in the air at 450° C.

It is an important feature of the invention that this hard carbon should be practically uniformly distributed throughout the refractory body material and on this depends the uniformity of the electric resistance of the body as a whole and the heat distribution throughout the conductive paths of said body afforded by the carbon. This eliminates hot spots and consequent breakdown during the operative life.

While there are many refractory bodies that may be used, I prefer to use a porous body of pure alundum. Silica, thoria, and other porous oxide bodies may also be used.

Optimum results are obtained when the carburizing agent and the refractory material are substantially pure and particularly when the refractory material is free from metallic iron, iron oxides and metallic alkalies. I have obtained pure hard carbon impregnation by heating to a range of temperatures between 800° C. to 1400° C. in an atmosphere of a carbon rich hydrocarbon gas such as methane, ethane or acetylene among others, in a clean quartz tube furnace. While I have mentioned that the preferred porous refractory body is made of alundum, I do not desire to be limited to this refractory and may use many other high melting point refractories. Porosity, however, is very important and the refractory body or whatever material should for best results be characterized, preferably, by a continuous and intercommunicating type of porosity in which the pores, passages or channels link up and communicate with each other throughout the body, thus affording thoroughfares by which the hydrocarbon gas can penetrate to the innermost parts of the refractory where they can be cracked, thus coating the walls of the passages with hard carbon and also carbidizing the refractory itself. Hard carbon so made is relatively oxidation-resistant and practically inert at the useful temperature at which such resistances operate. The resistors of this invention will operate in air at temperatures as high as 300° to 450° C.

One specific example of a method of making a resistor body of the invention as applied to alundum rods of 30 mils diameter may be briefly described as follows:

A furnace consisting of a tube of pure fused quartz or fused silica suitably heated by electric heating coils and thoroughly cleaned is prepared. A charge of rods of pure porous alundum is introduced into the tube and the heat is turned on. Assuming the rods are of a diameter of thirty mils, the temperature is raised to a range of between 800° C. to 1400° C., it being understood that larger bodies will require higher temperatures and longer heating to produce the same resistance. A hydrocarbon gas, which may be methane, is let into the tube and maintained at a pressure of about one atmosphere and the rods are exposed to the gas for about 8 minutes. The rods may be heated to the predetermined temperature before the gas is admitted to the tube, or they may be put into the tube cold and heated to the predetermined temperature while the gas is flowing through. The rods should be heated uniformly throughout. The methane, at the pressure indicated, penetrates into the pores throughout the alundum rods, is there cracked and the carbon thereof is deposited in a pure hard layer of carbon on the walls of the pores. Apparently, also, a considerable quantity of carbon is combined with the alundum itself as carbide. The deposited carbon, however, extends throughout the body treated as a hard oxidation-resistant, practically inert carbon. It is, furthermore, distributed practically uniformly throughout the refractory body. Examination of alundum rods so treated shows the presence of the carbon either as the hard inert pure carbon or as alundum carbide throughout all planar cross sections at any place where the rods are broken.

Furthermore, it is to be noted that the degree of electric resistance depends upon the density of the carbon taken up by the porous alundum and the resistance can be predetermined for all practical purposes and for any given size of refractory body by adjustment of one or more of the following process variables:

(1) Time of exposure to the hydrocarbon gas at the cracking temperature;
(2) The cracking temperature maintained in the refractory body during exposure to the gas;
(3) The carbon content of the gas; and
(4) The flow rate and/or the pressure of the gas during the treatment.

When the desired carbon density is attained the carbon-impregnated rods are permitted to cool in the hydrocarbon atmosphere and this is done either by removing the heat source or by removing the treated bodies to a cooler area of the furnace. When they have cooled down to about room temperature they may be removed from the hydrocarbon atmosphere and exposed to the air.

Figure 2:
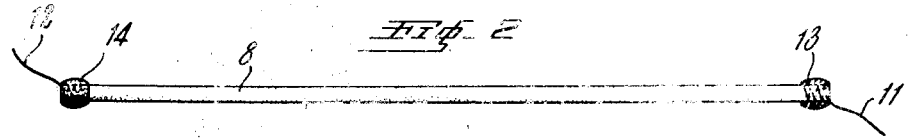

In the drawings are shown an apparatus for carrying out the process and an impregnated body of the invention prepared for use as a cathode for a vacuum tube. Fig. 1 represents diagrammatically a furnace suitable for use in carrying out the process; Fig. 2 shows a resistance rod with its terminals which may be used either as a heater for an indirectly heated cathode or, if coated with electron emitting substances, for a directly emitting cathode.

Referring now to Fig. 1, the fused quartz tube 1 is closed at each end by the removable plugs 2 and 3. The tube 1 passes through the electric furnace 4, heated by the coils 6 connected with a source of electric current, not shown. Within the tube where it is enclosed by the furnace 4 is placed an alundum boat 7 in which the pure alundum rods 8 are placed. The rods 8 are very porous and the pores are filled with air and occluded gases which should be driven out before the hydrocarbon gas is admitted. Accordingly, the furnace is heated to bring the alundum rods to a temperature between 800° C. to 1400° C. Then the hydrocarbon gas, preferably methane, is admitted to the tube 1 through the inlet 9 and flows through the tube to the outlet 10. As the alundum rods are now heated approximately uniformly throughout, the methane passes over and penetrates into the pores of the hot degasified rods and is cracked, forming a pure, hard deposit of carbon in the pores throughout the rods and effecting a considerable degree of carbidization of the alundum. The cracked gases are then passed out from tube 1 through outlet 10, means (not shown) being provided to collect the cracked gases. The pressure of the gas in the tube may be regulated at from less than an atmosphere, to as much as two atmospheres in accordance with the desired density of carbon and hence the desired electric resistance.

In Fig. 2 is shown a rod prepared in the apparatus of Fig. 1 adapted for use as a cathode or heating element for an indirectly heated cathode of a radio vacuum tube. The body 8 is a rod which has been carbon impregnated in the apparatus of Fig. 1, the pure hard dense carbon in the pores of which furnish a conducting path but the whole of the rod constituting a resistor. As this resistor is designed to be mounted in a radio vacuum tube, it must be furnished with terminals which are to be welded to the leads. The rod or resistor is first prepared in the apparatus illustrated diagrammatically in Fig. 1. The terminals should not be, for best results affixed to the rod until it is removed from the furnace.

I have succeeded in producing a peculiarly satisfactory terminal for cathode use consisting of a wire coil of such inside dimensions as to fit by twisting onto a resistance rod of the invention and bonding the same to said resistance with a special refractory paste sufficiently conductive to channel off and to dissipate the heat from the rod current so as to achieve a more uniform heat path through the terminal and rod and secure a cool end.

The binding paste used may consist of a carbidized refractory material in powder form which may be alundum but not necessarily the same refractory material forming the electrical resistance body itself. This powder is mixed with a suitable binder, such as nitrocellulose dissolved in amyl acetate or diethylene glycol mono butyl ether. Cellulose solvents such as these have a low vapor pressure at room temperature, but will volatilize from the paste instantaneously at temperatures between 100 and 200° C.

A simple paste which is quite satisfactory may be prepared by mixing a carbidized refractory powder as, for instance, carbidized alundum with the binder until a desired paste-like consistency is achieved. The proportions of the binder may be given as 50 grams of 60-80 second nitrocellulose to 1000 c. c. of C. P. amyl acetate. The wire coil terminals are affixed to the resistor rod by first twisting the coil onto the end of the rod and then covering the same with the aforesaid paste until a bead of paste is formed over the coil part of the terminal. A moderate heating, say 150 to 200° C., will wholly evaporate the solvent so that a firm connection is made between the terminal and the resistor rod. A terminal so bound to the resistor secures good electrical contact and runs relatively cool. In Fig. 2 these coils with their bead of binder are indicated by the numerals 13 and 14. The bead 13 is broken away to show the coil of the terminal 11 wound around the end of alundum rod 8.

The resistor of the invention may be of various sizes and shapes according to the use to which it may be put. In the rod form illustrated in Fig. 2, it may be used as a cathode or heater for a cathode of an electron discharge tube. If used as a cathode, a middle area of the rod is directly coated with electron-emitting oxides such as the oxides of barium, strontium and calcium, the ends of the rod being uncoated to facilitate mounting. On the passage of current, the rod is heated and the oxide coating is thereby activated to produce a copious emission of electrons. When used strictly as a heater for an indirectly heated cathode, the electron-emitting materials are not coated directly on the resistor but upon a tube of a metal such as nickel within which the resistor is placed. In this case the resistor becomes heated on passage of current and in turn heats the metal tube and the electron-emitting materials causing a copious electron emission therefrom.

The resistors of the invention will operate efficiently in a vacuum at temperatures as high as 850° C. with uniform electrical resistance along the conductive path for a life of 10,000 hours. When used as a cathode in an electron-discharge device, such as a radio vacuum tube, it will operate with stable resistance over wide temperature ranges with negligible noise characteristics and rapidly attains normal operating and peak emission levels. It is, moreover, well suited to high frequency applications.

A rod of the invention can be tapped at various points to make a very efficient voltage divider.

As a heater, resistor or cathode, the device of the invention permits higher wattage ratings in smaller spaces and when used as a cathode with the electron-emitting coating directly applied, the coating will not flake or chip off even under extreme shock.

The resistor of the invention can be operated uncoated in air at a temperature of 450° C. but its wattage capacity can be greatly increased if it is coated with fused glass or vitreous enamel or with fused quartz. Also it is to be noted that terminals may be affixed in manner different from that hereinabove described. For instance, the terminals may be plated on the ends of the resistor in known manner or they may be applied in other ways known to the art.

Having thus described my invention, what I claim is:

1. An electric resistor consisting of a porous refractory oxide body of the group consisting of alundum, silica and thoria impregnated throughout the pores of the body with a pure, hard, oxidation-resistant carbon, the refractory body itself being carbidized.

2. An electric resistor consisting of a porous alundum body impregnated throughout the pores thereof with a pure, hard, oxidation-resistant carbon, the alundum being also carbidized.

3. An electric resistor consisting of a carbidized porous alundum body impregnated throughout with a pure, hard, oxidation-resistant carbon.

4. An electric resistor consisting of a carbidized porous alundum body impregnated throughout with a pure, hard, oxidation-resistant carbon said body being thereby adapted to operate for 10,000 hours at 850° C. in a vacuum without substantial change in resistance.

5. An electric resistor consisting of a porous, refractory, oxide body of the group consisting of alundum, silica and thoria carbidized and impregnated with a pure, hard carbon that is substantially non-oxidizable in air at 450° C., said body being thereby adapted for operation in a vacuum or inert gas with uniform resistance at a temperature of 850° C.

6. An electric resistor consisting of a carbidized, porous, oxide body of the group consisting of alundum, silica and thoria impregnated throughout with a pure, hard, oxidation-resistant carbon coated externally with electron emissive materials, said resistor being thereby adapted for operation as a cathode of an electron discharge device during a long useful life in a vacuum or inert gas at a temperature of 850° C.

7. An electric resistor according to claim 6 adapted for operation as a cathode of an electron discharge device during a useful life of 10,000 hours in a vacuum or inert gas at a temperature of 850° C., attaining peak emission levels rapidly and maintaining the same throughout said life.

8. A method of preparing an electric resistor that comprises heating a porous, refractory, oxide body of the group consisting of alundum, silica and thoria to a temperature of 800° C. to 1400° C. in a hydrocarbon gas and maintaining it at that temperature until the refractory body is carbidized and the pores thereof are coated with a pure, hard, oxidation-resistant carbon.

9. A method of preparing an electric resistor that comprises heating a porous refractory alundum body to a temperature of 800° C. to 1400° C. in an atmosphere of methane and maintaining it at that temperature until said alundum is carbidized and the pores thereof are filled throughout with a pure, hard, oxidation-resistant carbon.

10. An electric resistor adapted to operate for 10,000 hours at 850° C. in a vacuum without substantial change in resistance, consisting of a carbidized alundum body the pores of which are filled with a pure, hard, oxidation-resistant carbon.

11. A method of preparing an electric resistor that comprises heating a porous refractory alundum body to a temperature of 800° C. to 1400° C. in an atmosphere of hydrocarbon gas and maintaining it at that temperature until said alundum is carbidized and the pores thereof are filled throughout with a pure, hard, oxidation-resistant carbon.

THEODORE R. PALUMBO.

REFERENCES CITED

The following references are of record in the file of this patent:

UNITED STATES PATENTS

| Number | Name | Date |
|---|---|---|
| 648,518 | Ochs | May 1, 1900 |
| 1,470,300 | Szarvasy | Oct. 9, 1923 |
| 1,978,323 | Power | Oct. 23, 1934 |
| 2,057,431 | Hobrock | Oct. 13, 1936 |
| 2,133,672 | Singewald, Jr. | Oct. 18, 1938 |
| 2,200,521 | Seigel | May 14, 1940 |
| 2,392,682 | Marek | Jan. 8, 1946 |
| 2,405,449 | Robinson et al. | Aug. 6, 1946 |
| 2,414,625 | Abrams et al. | Jan. 21, 1947 |
| 2,438,732 | Williams | Mar. 30, 1948 |

FOREIGN PATENTS

| Number | Country | Date |
|---|---|---|
| 699,457 | France | Feb. 16, 1931 |